United States Patent
Danilov et al.

(10) Patent No.: US 10,635,340 B2
(45) Date of Patent: Apr. 28, 2020

(54) STORAGE TIERING WITH EFFICIENT ALLOCATION OF REDUNDANT DATA

(71) Applicant: EMC IP Holding Company LLC, Hopkinton, MA (US)

(72) Inventors: Mikhail Danilov, Saint Petersburg (RU); Konstantin Buinov, Kirovsk (RU); Andrey Fomin, Vsevolozhsk (RU); Mikhail Malygin, Saint-Petersburg (RU); Vladimir Prikhodko, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 158 days.

(21) Appl. No.: 15/631,572

(22) Filed: Jun. 23, 2017

(65) Prior Publication Data

US 2018/0173453 A1    Jun. 21, 2018

(30) Foreign Application Priority Data

Dec. 21, 2016   (RU) .................................. 2016150405

(51) Int. Cl.
*G06F 13/00* (2006.01)
*G06F 3/06* (2006.01)

(52) U.S. Cl.
CPC ............ *G06F 3/0647* (2013.01); *G06F 3/067* (2013.01); *G06F 3/0611* (2013.01); *G06F 3/0619* (2013.01); *G06F 3/0653* (2013.01)

(58) Field of Classification Search
CPC .... G06F 3/0647; G06F 3/0611; G06F 3/0619; G06F 3/0653; G06F 3/067
See application file for complete search history.

(56) References Cited

U.S. PATENT DOCUMENTS

| | | | |
|---|---|---|---|
| 7,809,888 B1* | 10/2010 | Clark ................. | G06F 12/0897 711/118 |
| 2011/0276539 A1* | 11/2011 | Thiam ................ | G06F 11/1448 707/634 |
| 2014/0052942 A1* | 2/2014 | Satou .................... | G06F 12/00 711/154 |
| 2017/0097887 A1* | 4/2017 | McKean ............. | G06F 12/0868 |

\* cited by examiner

*Primary Examiner* — Charles Rones
*Assistant Examiner* — Han V Doan
(74) *Attorney, Agent, or Firm* — Womble Bond Dickinson (US) LLP (57) ABSTRACT

Described is a system that allows for the efficient management of reallocating data between tiers of an automated storage tiering system. In certain configurations, protected data that is stored within the storage system may include a user data portion and a redundant data portion. Accordingly, to conserve space on higher storage tiers, the system may separate user data from the redundant data when reallocating data between tiers. For example, the system may only allocate the user data portion to higher storage tiers thereby conserving the space that would otherwise be taken by the redundant data, which remains, or is demoted to a lower tier. Moreover, the reallocation may occur during scheduled reallocation cycles, and accordingly, the reallocation of the separated protected data may occur without any additional tiering overhead.

17 Claims, 6 Drawing Sheets

STORE A COMPONENT OF PROTECTED DATA IN A FIRST STORAGE TIER WITHIN A MULTI-TIER STORAGE CONFIGURATION, WHEREIN THE PROTECTED DATA COMPRISES USER DATA AND REDUNDANT DATA
601

DETERMINE A FIRST SET OF USAGE CHARACTERISTICS OF THE PROTECTED DATA WHILE THE PROTECTED DATA IS STORED IN THE FIRST STORAGE TIER
602

PERFORM A FIRST DATA REDISTRIBUTION CYCLE THAT PROMOTES OR DEMOTES THE COMPONENT OF PROTECTED DATA WITHIN THE MULTI-TIER STORAGE CONFIGURATION BASED ON THE DETERMINED SET OF USAGE CHARACTERISTICS
603

WHEN THE PROTECTED DATA IS PROMOTED, ONLY THE USAGE DATA OF THE PROTECTED DATA IS MOVED TO A SECOND TIER THAT IS HIGHER TIER THAN THE FIRST TIER WITHIN THE MULTI-TIER STORAGE AND THE REDUNDANT DATA REMAINS ON THE FIRST STORAGE TIER
604

WHEN THE PROTECTED DATA IS NOT PROMOTED, THE REDUNDANT DATA OF THE PROTECTED DATA IS MOVED TO A THIRD TIER THAT IS A LOWER TIER THAN THE FIRST TIER WITHIN THE MULTI-TIER STORAGE AND THE USAGE DATA REMAINS ON THE FIRST STORAGE TIER
605

STORAGE TIERING WITH EFFICIENT ALLOCATION OF REDUNDANT DATA

TECHNICAL FIELD

Embodiments of the present disclosure relate generally to data storage systems. More particularly, embodiments of the disclosure relate to an efficient system and process for storage tiering.

BACKGROUND

When providing a storage and recovery system, configurations may implement automated storage tiering (or multi-tiering). Storage tiering typically involves the assignment of different categories of data to various types of storage devices to improve storage efficiency and cost. For example, the storage tiering includes the automated promotion or demotion of data across different tiers (or types) of storage devices. These tiers may be determined by performance and cost of the storage devices, and data may be assigned to tiers based on various characteristics such as how often the data is accessed. For example, storage tiering policies may reassign the most frequently accessed data on the highest performing storage and rarely accessed data to lower performance or more cost effective storage devices. Accordingly, systems may continuously monitor the activity level of data and automatically move active data and inactive data to the most appropriate storage tier based on a policy, which an administrator may manage.

Although automated storage tiering provides a mechanism to efficiently manage storage performance and cost, there is always a need to improve data management techniques. For example, there is a continued need to efficiently manage which data gets promoted and demoted when moving data between storage tiers.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Described is a system and technique for collecting and analyzing memory usage information of one or more devices. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

Described is a system (and method) that allows for the efficient management of data reallocation between tiers of storage system. In certain configurations, data may be stored in a manner that provides data protection by storing user data (e.g. information to be stored) together with its redundant data (information used to recover the user data). Accordingly, this protected data may include a user data portion and a redundant data portion. User data may include any form of data such as files, objects, streams, blocks, or other form of information that is to be stored, and redundant data may include any data that may be used to verify or recover the user data (e.g. after a failure). For example, depending on the data protection scheme implemented by the storage system, redundant data may include a mirror copy of the data, a parity block, coding fragments, or any other type of redundant data.

Typically, when reallocating protected data, the data is transferred as a unit (e.g. user data and redundant data). However, in the embodiments as described herein, the system may separate the user data from the redundant data when reallocating the protected data. For example, the system may separate user data from the redundant data, and store the user data on a higher storage tier and/or demote redundant data, which is rarely accessed, to a lower tier. Thus, the system may conserve the amount of data allocated to higher tiers that would otherwise be consumed by redundant data. Moreover, in some embodiments, the reallocation may occur during scheduled reallocation cycles, and accordingly, the reallocation of the separated protected data may occur without any additional tiering overhead.

Figure 1:
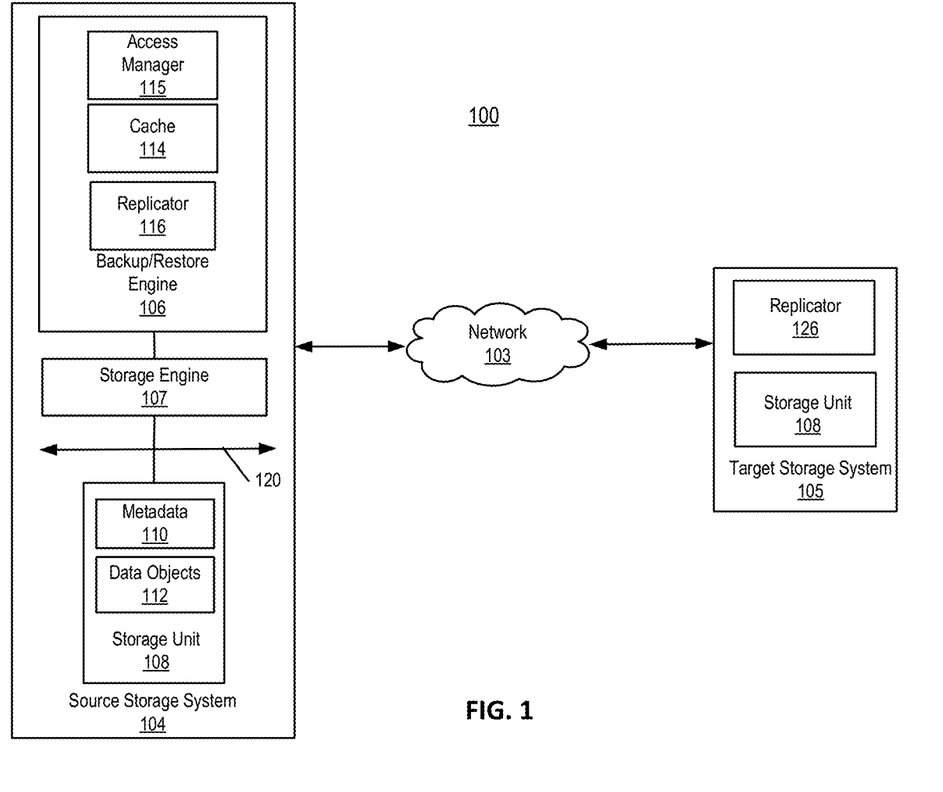
FIG. 1 is a block diagram illustrating an example storage system according to an embodiment of the disclosure.

FIG. 1 is a block diagram illustrating a storage system according to one embodiment of the disclosure. System 100 includes, but is not limited to, source storage system 104 communicatively coupled to target storage system 105 over network 103. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage systems 104-105 may include any type of server or cluster of servers (e.g., cloud servers). For example, source storage system 104 may be a storage server used for any of various different purposes, such as to provide multiple users with access to shared data and/or to back up mission critical data. Source storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 may have a distributed architecture, or all of its components may be integrated into a single unit. Source storage system 104 may be implemented as part of an archive and/or backup system such as a deduplicating storage system.

In one embodiment, source storage system 104 includes, but is not limited to, backup/restore engine 106, storage engine 107, and storage unit 108 communicatively coupled to each other. As shown, the source storage system 104 and the target storage system may include a storage unit 108. The storage unit 108 may employ storage tiering as further described and may be implemented locally (e.g., single node operating environment) or remotely (e.g., multi-node operating environment) via interconnect 120, which may be a bus and/or a network. In one embodiment, storage unit 108 operates as an active storage to receive and store external or fresh user data. Storage unit 108 may be, for example, conventional magnetic disks, solid state disks, optical disks such as CD-ROM or DVD based storage, magnetic tape storage, magneto-optical (MO) storage media, flash memory based devices, or any other type of non-volatile storage devices suitable for storing large volumes of data. Storage unit 108 may also be combinations of such devices. In the case of disk storage media, the storage unit 108 may be organized into one or more volumes of Redundant Array of Inexpensive Disks (RAID).

In response to data being stored in storage unit 108, storage engine 107 may be configured to segment the data file into multiple segments according to a variety of segmentation policies or rules. Storage engine 107 may choose not to store a segment in a storage unit if the segment has been previously stored in the storage unit. In the event that storage engine 107 chooses not to store the segment in the storage unit, it stores metadata enabling the reconstruction of the file using the previously stored segment. As a result, segments of data files are stored in a deduplicated manner within storage unit 108. Data stored in the storage unit may be stored in a compressed form (e.g., lossless compression: Huffman coding, Lempel-Ziv Welch coding; delta encoding: a reference to a segment plus a difference; etc.).

The metadata, such as metadata 110, may be stored in storage unit 108, such that files can be accessed independent of another storage unit. Metadata of each storage unit includes enough information to provide access to the files it contains. In one embodiment, metadata may include fingerprints contained within data objects 112, where a data object may represent a data segment, a compression region (CR) of data segments, or a container of one or more CRs. Fingerprints are mapped to a particular data object via metadata 110, enabling the system to identify the location of the data object containing a segment represented by a particular fingerprint. When an active storage unit fails, metadata contained in another storage unit may be utilized to recover the active storage unit. For example, as further described herein, the metadata may store an association (e.g. tier location) of user data and its corresponding redundant data. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

Referring back to FIG. 1, according to one embodiment, backup engine 106 includes cache 114, access manager 115, and replicator 116. Access manager 115 is to provide file services to a variety of clients, such as a backup/restore application, to backup files stored in storage unit 108, in this example, represented as data objects 112 that are deduplicated by storage engine 107. Typically, when a request is received to access a file such as a backup file, data objects of the requested file are loaded into a memory of source storage system 104. Since the file may be large, only a portion of data objects of the file is loaded or cached in the memory at a time for accessing.

In one embodiment, replicator 116 is responsible for replicating, i.e., archiving, data stored on storage unit 108 onto a target storage system. For example, replicator 116 may be configured to replicate data on storage unit 108 onto target storage system 105. It will be appreciated, however, that system 100 is not limited to replicating data from one source storage to another one target storage. For instance, replicator 126 of target storage system may also be configured to replicate data on storage unit 108 of the target storage system 105 onto storage unit 108 of the source storage system 104, in which case storage system 105 acts as the "source" and system 104 acts as the "target". For the sake of simplicity, throughout the description replication shall be discussed in the context of storage system 104 and storage system 105 as source and target, respectively.

Figure 2:
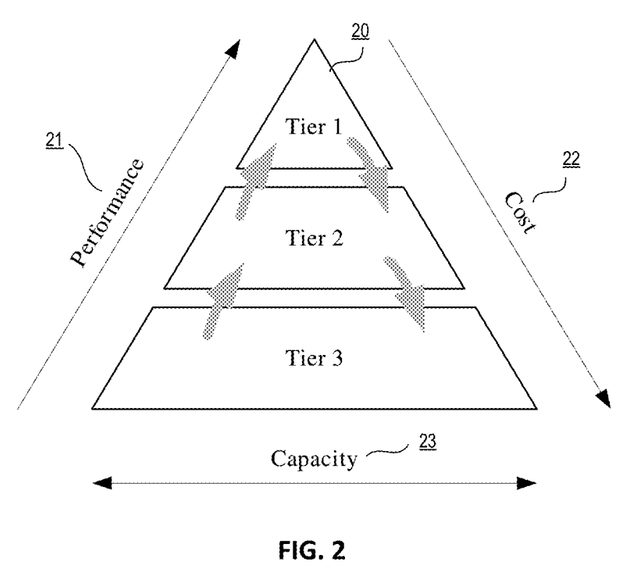
FIG. 2 is a diagram illustrating a representation of the dynamics of storage tiering according to an embodiment of the disclosure.

FIG. 2 is a diagram illustrating a representation of the dynamics of storage tiering according to one embodiment of the disclosure. A storage system (e.g. storage unit 108) may be configured as a multi-tier storage that uses various tiers in a storage hierarchy. Accordingly, one or more tiers of storage in this hierarchy may utilize different kinds of storage devices and/or may be optimized for different characteristics such as random update performance. For example, as shown, the storage system may include several tiers 20 that provide different levels of performance 21, cost 22, and capacity 23. As shown in this representation, performance 21 increases the higher the storage tier, whereas the cost 22 typically decreases the lower the storage tier. Moreover, capacity 23 also typically increases at lower level storage tiers. Accordingly, as further described herein, embodiments may account for these dynamics to efficiently manage data allocation at various storage tiers 20. For example, data (e.g. files) may be periodically moved among the tiers based on data management policies to achieve a cost-effective match to the current storage requirements of the data. For instance, data may initially be stored in a tier of storage that offers high performance for reads and writes. As the data ages, it may be moved into a lower tier of storage according to embodiments of the disclosure.

Furthermore, the storage tiers may include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 3:
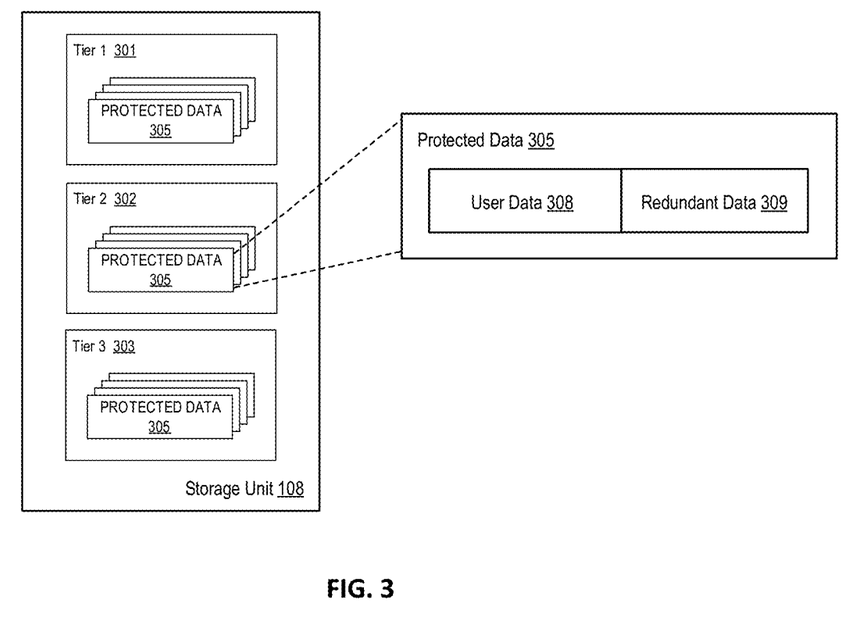
FIG. 3 is a block diagram illustrating a representation of protected data stored within storage tiers according to some embodiments of the disclosure.

FIG. 3 is a block diagram illustrating a representation of protected data stored within storage tiers according to some embodiments of the disclosure. As shown, the storage unit 108 may include various tiers of storage (e.g. tier 1 301, tier 2 302, tier 3 303) each of which may store protected data 305. In one embodiment, the storage unit 108 may act as a form of a backup storage (or archival storage, recovery storage, etc.), and accordingly, the system may store the data in a protected data 305 format. For example, in some embodiments, the protected data 305 may include user data 308 (or a user data portion) and redundant data 309 (or a redundant data portion). As described above, user data 308 may include any form of data to be stored (e.g. data written by an application), and redundant data 309 may include any data that may be used to verify or recover the user data (e.g. provided by the system for recovery purposes). As described, the redundant data 309 may be any type of data such as a mirror copy of the user data, a parity block, coding fragments, or any other type of redundant data based on the data protection scheme employed by the system. In one embodiment, data that is stored on one or more storage units includes only stored in a protected data 305 format including a user data 308 portion and a redundant data 309 portion. As shown, this protected data 305 may reside a various storage tiers Accordingly, the system may reallocate (e.g. promote and demote) portions of the protected data 305 as further described herein.

Figure 4A:
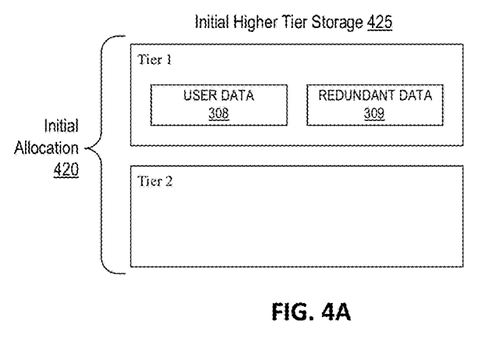
FIGS. 4A-4B is a block diagram illustrating a representation of demoting redundant data to a lower storage tier according to an embodiment of the disclosure.
Figure 4B:
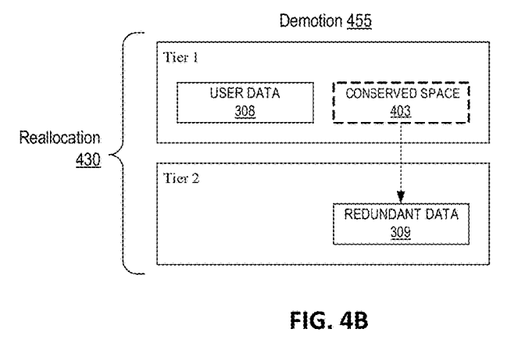

FIGS. 4A-4B is a block diagram illustrating a representation of demoting redundant data to a lower storage tier according to an embodiment of the disclosure. FIG. 4A shows an example of protected data including user data 308 and redundant data 309 initially residing on a higher tier storage 425. For example, based on the usage characteristics of the user data 308 the system may store the data on a Tier 1 storage as an initial allocation 420. FIG. 4B shows an example of a demotion 455 of the protected data after a reallocation 430. As shown, the user data 308 may continue to reside on the Tier 1 storage, while the redundant data 309 is reallocated (e.g. moved) to the Tier 2 storage. Accordingly, as shown, there is now conserved space 403 on the Tier 1 storage that would otherwise be consumed by the redundant data 309. In order to maintain the associations between user data and the redundant data, the system may also store a reference that links the redundant data to the corresponding usage data.

Figure 5A:
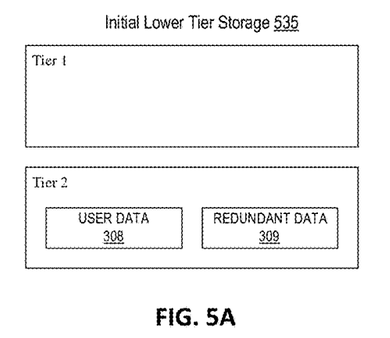
FIGS. 5A-5B is a block diagram illustrating a representation of promoting user data to a higher storage tier according to an embodiment of the disclosure.
Figure 5B:
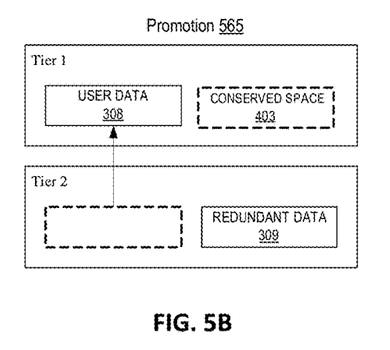

FIGS. 5A-5B is a block diagram illustrating a representation of promoting user data to a higher storage tier according to an embodiment of the disclosure. FIG. 5A shows an example of protected data initially residing on a lower tier storage 535. For example, based on the usage characteristics of the user data 308 the system may store the data on a Tier 1 storage as an initial allocation. FIG. 5B shows an example of a promotion 565 of the protected data after a reallocation. As shown, the user data 308 may be promoted and may now reside on the Tier 1 storage, while the redundant data 309 remains on the Tier 2 storage. Accordingly, as shown, there is now conserved space 403 on the Tier 1 storage that would otherwise be consumed by the redundant data 309.

Figure 6:
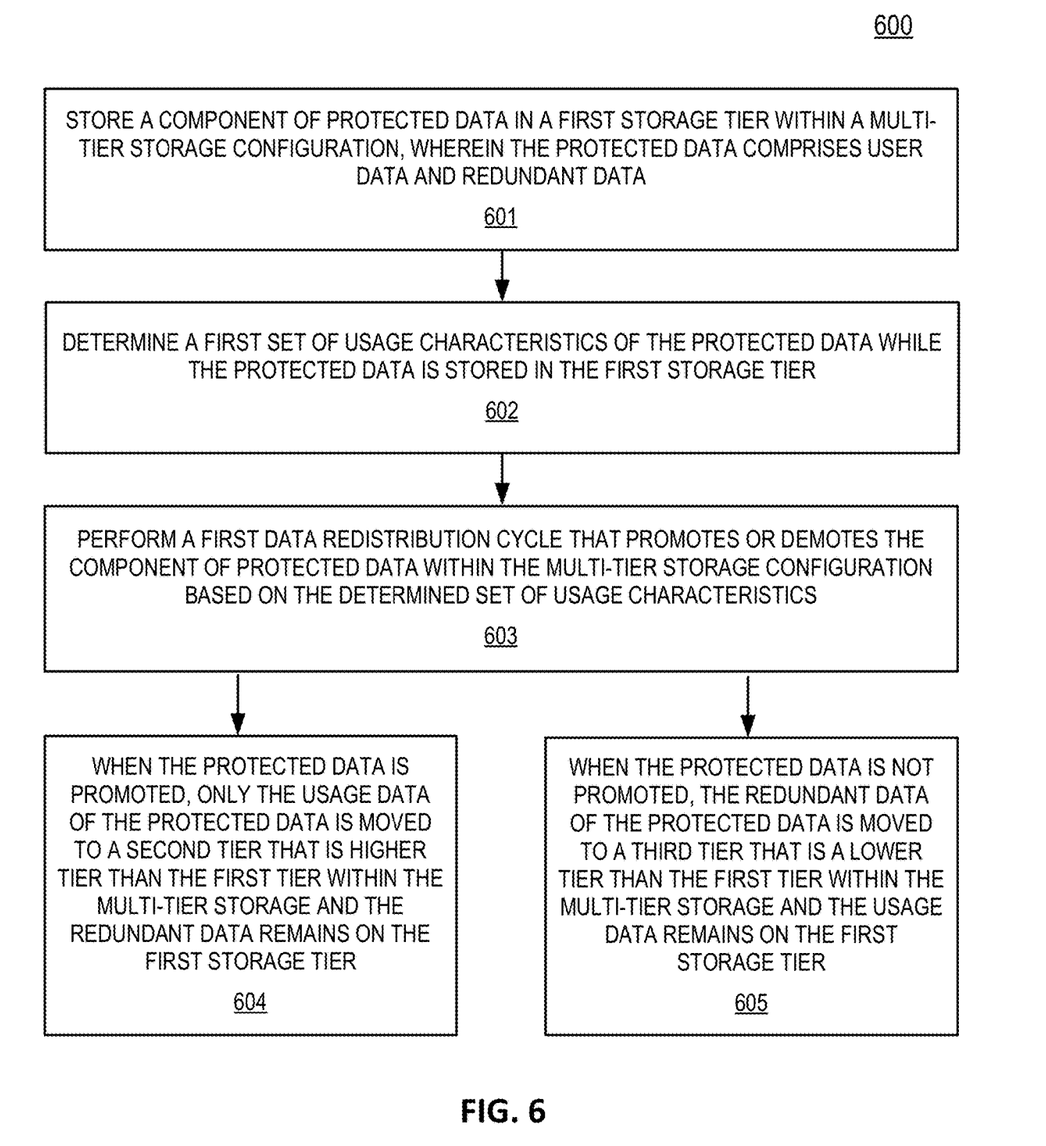
FIG. 6 is a flow diagram illustrating a method for reallocating portions of protected data according to an embodiment of the disclosure.

FIG. 6 is a flow diagram illustrating a method for reallocating portions of protected data according to some embodiments of the disclosure. Method 600 may be performed by a system (e.g. system 100), or one or more components of the system (e.g. source storage system 104, or target storage system 105, storage engine 107, etc.).

At block 601, the system may store protected data (e.g. protected data 305) in a first storage tier within a multi-tier storage configuration. As described, the protected data may include user data (e.g. user data 308) and redundant data (e.g. redundant data 309). At block 602, the system may determine a first set of usage characteristics of the protected data while the protected data is stored in the first storage tier. At block 603, the system may perform a first data reallocation cycle that promotes or demotes the component of protected data within the multi-tier storage configuration. In one embodiment, the system may determine whether to perform a promotion or a demotion based on the determined set of usage characteristics. For example, the usage characteristics may include the type of data stored, the frequency at which the data is accessed, a duration of time since the data was last accessed, age of the data, etc. In addition, the reallocation cycles may reallocate particular tiers based on various polices. For example, a policy may determine which storage tiers are marked for reallocation When the protected data is promoted, in one embodiment at block 604, only the user data of the protected data may be moved to a second storage tier (e.g. tier 1 301) that is higher tier than the first storage tier (e.g. tier 2 302) within the multi-tier storage, and accordingly, the redundant data remains on the first storage tier (e.g. tier 2 302).

When the protected data is not promoted, in one embodiment at block 605, the redundant data of the protected data may be moved to a third storage tier (e.g. tier 3 303) that is a lower tier than the first storage tier (e.g. tier 2 302) within the multi-tier storage, and accordingly, the usage data remains on the first storage tier (e.g. tier 2 302).

The system may perform reallocations in one or more cycles that may occur based on a schedule. The schedule may be set based on a policy and may include hourly, daily, weekly, etc. timeframes. Moreover, the schedule may be dynamic and, for example, perform a reallocation in response to various criteria such as a particular storage event. For example, the storage event may include when a particular application stores data, or when certain other characteristics are satisfied (e.g. total amount of data stored, access frequency, etc.).

In one embodiment, the system may perform a first data reallocation cycle in response to determining that the usage data and the redundant data of the protected data is stored together on the first storage tier. For example, the system may traverse particular storage tiers (e.g. the highest storage tier) and determine that there is protected data that is stored such that the user data is stored together with the protected data. Accordingly, in one embodiment, the system may identify such protected data and demote redundant data to lower storage tiers as a first cycle. In addition, in one embodiment, the system may perform the first reallocation cycle for only a set of high storage tiers (e.g. tiers in which data may not be further promoted such as tier 1 301).

In one embodiment, the system may also perform a second cycle to identify protected data stored on one or more lower storage tiers (e.g. tier 2 302 or tier 3 303) and promote only the user data portion of the protected data marked for promotion. Furthermore, in one embodiment, the second reallocation cycle may be performed after the first reallocation cycle.

Figure 7:
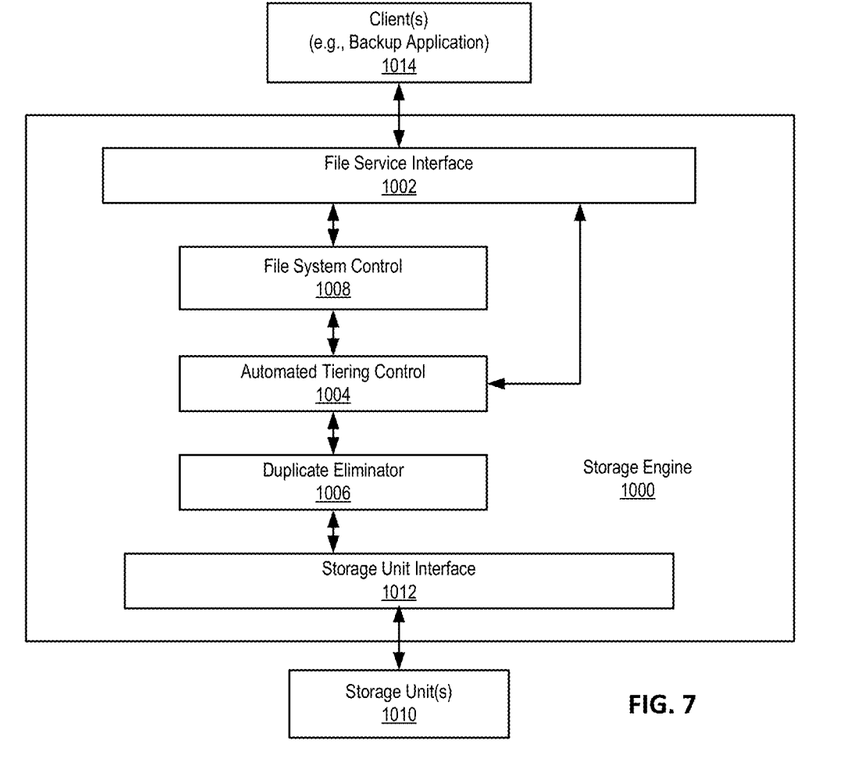
FIG. 7 is a block diagram illustrating a storage engine to may be used in conjunction with one or more embodiments of the disclosure.

FIG. 7 is a block diagram illustrating a storage engine to may be used in conjunction with one or more embodiments of the disclosure. For example, storage engine 1000 may be implemented as part of a storage system as described above, such as storage engine 107 of FIG. 1. Referring to FIG. 7, in one embodiment, storage engine 1000 includes file service interface 1002, automated tiering control 1004, duplicate eliminator 1006, file system control 1008, and storage unit interface 1012. Storage engine 1000 receives a data (e.g. files, data items, etc.) via file service interface 1002, which may be part of a file system namespace of a file system associated with the storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by automated tiering control 1004 and file system control 1008. Automated tiering control 1004 allocates the protected based on various characteristics as described above. For example, protected data (or protected data file) may be separated into a user data portion (or user data file) and a redundant data portion (or redundant data file), and the user data portion may be allocated to a higher tier than the redundant portion as described above.

In one embodiment, file system control 1008 processes information to indicate the tier association with a user data and redundant data. For example, an index may used to locate stored data portions in storage units 1010 via storage unit interface 1012. Duplicate eliminator 1006 identifies whether a newly received segment (e.g. protected data) has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Although the processes or methods are described above in terms of some sequential operations, it should be appreciated that some of the operations described may be performed in a different order. Moreover, some operations may be performed in parallel rather than sequentially.

The processes or methods depicted in the preceding figures may be performed by processing logic that comprises hardware (e.g. circuitry, dedicated logic, etc.), software (e.g., embodied on a non-transitory computer readable medium), or a combination of both. As referred to herein, a machine-readable medium (or computer readable medium) includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Embodiments of the present disclosure are not described with reference to any particular programming language. It will be appreciated that a variety of programming languages may be used to implement the teachings of embodiments of the disclosure as described herein. The term "approximately" may be used herein in association with a claim recitation and may be interpreted as "as nearly as practicable," "within technical limitations," and the like. In addition, the use of the term "or" indicates an inclusive "or" (e.g. "and/or") unless otherwise specified.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    storing protected data in a first storage tier within a multi-tier storage configuration, wherein the protected data comprises usage data and redundant data, wherein each of a plurality of storage tiers in the multi-tier storage configuration has a different level of performance and capacity;
    determining a first set of usage characteristics of the protected data while the protected data is stored in the first storage tier, wherein a reference that links the redundant data and the usage data in the first storage tier is stored; and
    in response to determining that the usage data and the redundant data of the protected data is stored together on the first storage tier, performing a first data reallocation cycle that promotes or demotes the protected data within the multi-tier storage configuration based on the determined set of usage characteristics, wherein when the protected data is promoted, only the usage data of the protected data is moved to a second storage tier that is a higher tier than the first storage tier within the multi-tier storage configuration and the redundant data remains on the first storage tier, wherein the second storage tier has a higher performance and a lower storage capacity than the first storage tier, and wherein after the moving of the usage data to the second storage tier, the reference between the redundant data and the usage data is maintained.

2. The method of claim 1, wherein when the protected data is demoted, the redundant data of the protected data is moved to a third storage tier that is a lower tier than the first storage tier within the multi-tier storage and the usage data remains on the first storage tier.

3. The method of claim 1, wherein the first data reallocation cycle is performed in response to determining that the protected data is stored on the first storage tier, wherein the first storage tier is marked as a storage tier for reallocation based on a storage policy.

4. The method of claim 1, wherein the redundant data comprises at least one of a mirror copy, a parity block, or a coding fragment.

5. The method of claim 1, wherein the first set of usage characteristics of the protected data includes at least a duration of time since the protected data was last accessed.

6. The method of claim 1, wherein the first set of usage characteristics of the protected data includes at least a frequency at which the protected data has been accessed while stored on the first storage tier.

7. A non-transitory computer-readable medium storing instructions which, when executed by one or more processors of a computing device, cause the computing device to perform operations comprising:

storing protected data in a first storage tier within a multi-tier storage configuration, wherein the protected data comprises usage data and redundant data, wherein each of a plurality of storage tiers in the multi-tier storage configuration has a different level of performance and capacity;

determining a first set of usage characteristics of the protected data while the protected data is stored in the first storage tier, wherein a reference that links the redundant data and the usage data in the first storage tier is stored; and in response to determining that the usage data and the redundant data of the protected data is stored together on the first storage tier, performing a first data reallocation cycle that promotes or demotes the protected data within the multi-tier storage configuration based on the determined set of usage characteristics, wherein when the protected data is promoted, only the usage data of the protected data is moved to a second storage tier that is a higher tier than the first storage tier within the multi-tier storage configuration and the redundant data remains on the first storage tier, wherein the second storage tier has a higher performance and a lower storage capacity than the first storage tier, and wherein after the moving of the usage data to the second storage tier, the reference between the redundant data and the usage data is maintained.

8. The medium of claim 7, wherein when the protected data is demoted, the redundant data of the protected data is moved to a third storage tier that is a lower tier than the first storage tier within the multi-tier storage and the usage data remains on the first storage tier.

9. The medium of claim 7, wherein the redundant data comprises at least one of a mirror copy, a parity block, or a coding fragment.

10. The medium of claim 7, wherein the first set of usage characteristics of the protected data includes at least a duration of time since the protected data was last accessed.

11. The medium of claim 7, wherein the first set of usage characteristics of the protected data includes at least a frequency at which the protected data has been accessed while stored on the first storage tier.

12. A device, comprising:
a memory storing instructions; and
a processor coupled to an engine and the memory to execute the instructions from the memory, the processor being configured to perform operations, the operations comprising:

storing protected data in a first storage tier within a multi-tier storage configuration, wherein the protected data comprises usage data and redundant data, wherein each of a plurality of storage tiers in the multi-tier storage configuration has a different level of performance and capacity;

determining a first set of usage characteristics of the protected data while the protected data is stored in the first storage tier, wherein a reference that links the redundant data and the usage data in the first storage tier is stored; and in response to determining that the usage data and the redundant data of the protected data is stored together on the first storage tier, performing a first data reallocation cycle that promotes or demotes the protected data within the multi-tier storage configuration based on the determined set of usage characteristics, wherein when the protected data is promoted, only the usage data of the protected data is moved to a second storage tier that is a higher tier than the first storage tier within the multi-tier storage configuration and the redundant data remains on the first storage tier, wherein the second storage tier has a higher performance and a lower storage capacity than the first storage tier, and wherein after the moving of the usage data to the second storage tier, the reference between the redundant data and the usage data is maintained.

13. The device of claim 12, wherein when the protected data is wet demoted, the redundant data of the protected data is moved to a third storage tier that is a lower tier than the first storage tier within the multi-tier storage and the usage data remains on the first storage tier.

14. The device of claim 12, wherein the first data reallocation cycle is performed in response to determining that the protected data is stored on the first storage tier, wherein the first storage tier is marked as a storage tier for reallocation.

15. The device of claim 12, wherein the first set of usage characteristics of the protected data includes at least a duration of time since the protected data was last accessed.

16. The device of claim 12, wherein the first set of usage characteristics of the protected data includes at least a duration of time since the protected data was last accessed.

17. The device of claim 12, wherein the first set of usage characteristics of the protected data includes at least a frequency at which the protected data has been accessed while stored on the first storage tier.

* * * * *

UNITED STATES PATENT AND TRADEMARK OFFICE
CERTIFICATE OF CORRECTION

PATENT NO. : 10,635,340 B2
APPLICATION NO. : 15/631572
DATED : April 28, 2020
INVENTOR(S) : Mikhail Danilov et al.

It is certified that error appears in the above-identified patent and that said Letters Patent is hereby corrected as shown below:

In the Claims

In Claim 13, Column 10, Line 38, "data is wet demoted, the redundant data" delete the word "wet"

Signed and Sealed this
Twenty-ninth Day of December, 2020

Andrei Iancu
*Director of the United States Patent and Trademark Office*